United States Patent [19]

Rheins

[11] 4,255,200

[45] Mar. 10, 1981

[54] METHOD OF MANUFACTURING POROUS, WATER-PERMEABLE AND NOT FROST-SUSCEPTIBLE TERRA COTTA PAVINGS USABLE AS GROUND COATING AND PAVINGS THUS OBTAINED

[75] Inventor: Michel A. Rheins, Paris, France

[73] Assignee: Socri International, Luxembourg, Luxembourg

[21] Appl. No.: 860,770

[22] Filed: Dec. 15, 1977

Related U.S. Application Data

[63] Continuation-in-part of Ser. No. 784,557, Apr. 4, 1977, abandoned.

[30] Foreign Application Priority Data

Dec. 17, 1977 [LU] Luxembourg .......................... 76412

[51] Int. Cl.³ ............................................. C04B 33/04
[52] U.S. Cl. ........................................ 106/71; 264/43; 264/44; 264/58; 264/67; 264/346
[58] Field of Search ................... 264/43, 44, 346, 58, 264/67; 106/71

[56] References Cited

U.S. PATENT DOCUMENTS

| | | | |
|---|---|---|---|
| 2,922,719 | 1/1960 | Robinson | 106/71 |
| 3,143,433 | 8/1964 | Blair | 106/71 |
| 3,297,801 | 1/1967 | Konrad | 264/44 |
| 3,764,403 | 10/1973 | Neely | 264/346 |
| 3,832,112 | 8/1974 | Dye | 264/58 |
| 3,873,658 | 3/1975 | Milholen et al. | 264/58 |
| 3,948,594 | 4/1976 | Irwin | 264/58 |

FOREIGN PATENT DOCUMENTS 499920  1/1939  United Kingdom ..................... 264/44

*Primary Examiner*—John Parrish
*Attorney, Agent, or Firm*—Louis E. Marn; Elliot M. Olstein

[57] ABSTRACT

The present invention relates to a method of manufacturing terra cotta pavings which may be used for ground surfacing, said pavings not being frost-susceptible, being porous and water-permeable, comprising the steps of: intimately mixing 100 parts by volume of clay with 80 to 160 parts by volume of dry, non-compressed sawdust, essentially formed of particles whose average diameter is included between 0.5 mm and 4 mm; adding water such that the total water content is between 8 and 30% by weight with respect to the weight of the mixture; shaping the pavings under pressure; drying the pavings; baking the pavings at a temperature between the temperature, above which the terra cotta is not frost-susceptible, and the melting temperature of this clay, and subjecting the faces of the pavings to pumicing.

17 Claims, No Drawings

METHOD OF MANUFACTURING POROUS, WATER-PERMEABLE AND NOT FROST-SUSCEPTIBLE TERRA COTTA PAVINGS USABLE AS GROUND COATING AND PAVINGS THUS OBTAINED

The present application is a continuation-in-part of my now abandoned application Ser. No. 784,557, filed Apr. 4, 1977.

The present invention relates to a method of manufacturing terra cotta pavings usable as a ground coating, said pavings not being frost-susceptible, being porous and water-permeable, and to the pavings thus obtained.

It has already been proposed, in the prior art, to produce bricks or pavings of terra cotta, the interior of which is rendered porous, to lighten them or simplify their process of preparation, with a view to manufacturing materials for the construction of walls or partitions, having in particular sound-insulating characteristics.

These bricks or pavings were made from a mixture of clay and a combustible matter, the combustible matter being consumed during baking, and leaving, inside the bricks, pores or cells which are closed or which communicate with one another depending on the intended use of these bricks.

It is an object of the present invention to provide a method of manufacturing pavings which may be used, not for producing walls or partitions, but for producing a ground coating, said pavings having in this case to possess all the following properties:

they must have a mechanical resistance enabling them to be used as ground coating, particularly for sport grounds, and especially for tennis courts or the like;

they must not be frost-susceptible, i.e. must not undergo any deterioration after a sucession of frost and thawing;

they must comprise intercommunicating pores to form vessels of such dimensions that the paving can absorb the water by capillarity up to saturation and, beyond saturation point, allow the water to flow by permeability.

In accordance with the invention, it is understood that a paving has a satisfactory capillarity and permeability if it can absorb, in less than 15 seconds, 10 cm$^3$ of water poured onto a point of its horizontal upper surface.

This, and other aims, are achieved by the present invention, whose first object is, accordingly, to provide a method for manufacturing terra cotta pavings which may be used to produce a ground coating, said pavings not being frost-susceptible, being porous and water-permeable, said method being characterized by the steps of:

intimately mixing 100 parts by volume of clay with 80 to 160, and preferably 120 to 135, parts by volume of dry, non-compressed sawdust, said sawdust being essentially formed of particles whose average diameter is comprised between 0.5 mm and 4 mm;

adding water to the mixture such that the total water content is between 8 and 30% by weight, with respect to the weight of the mixture;

forming the pavings are under pressure;

drying the pavings;

baking the pavings at a temperature between the temperature, above which the terra cotta obtained from the clay is not frost-susceptible, and the melting temperature of said clay; and subjecting the faces of the pavings to pumicing.

The invention also relates to the pavings manufactured according to this method.

The limits fixed, concerning the dosage of the mixture of clay and sawdust, as well as the grading of the sawdust, are to be respected absolutely since they guarantee the certitude of obtaining the results envisaged by the invention.

If these limits of dosage and/or grading are nor kept to, the pavings manufactured have reduced performances with, in addition, the risk of a certain part of these pavings being unsuitable for the applications envisaged. In particular, the relative volume and the grading retained for the sawdust mixed with the clay are determining factors for guaranteeing the absorption, by capillarity, of water running on the paving and its flow through said paving by permeability.

The clay chosen is that used conventionnally by tilers for its qualities, and particularly its lack of susceptibility to frost-cracking, whenever the clay has been baked at a temperature higher than the temperature above which the terra cotta is not frost-susceptible.

It is preferable to use clays having a good cohesion, comprising the minimum of foreign bodies, which are very pure and homogeneous, free of lime particles, pyrite or the like. These clays are preferably ferruginous so as to give the pavings a red shade after baking, which may be desirable if a tennis court coating is to be made.

To be mechanically resistant after baking, the clays must be chosen to be fat and plastic, i.e. in particular must have a high alumina silicate content, this moreover facilitating the mixture and shaping under pressure.

The clay located on the surface of the deposit will be avoided as it is more moist and less pure.

A man ordinary skilled in the art is in a position, from the above indications, to choose the clays which may suit the production of pavings according to the invention, or to adapt the clays at his disposal for example by adding silica in the form of sand, or iron oxide, etc.

The sawdust used is a sawdust of low density wood, such as softwood and conifers. It is preferable not to use wood with a higher density, for example higher than 0.8, which generally have too high a calorific power and would thus risk causing the burst of the fire in certain furnaces.

It is also desirable not to use wood containing a large quantity of tannin, such as oak or chestnut, said tannin giving the pavings a predominantly brown colour.

The sawdust must, in addition, be perfectly dry to allow sifting thereof, easy measurement of its volume, and a precise calculation of the final water content of the mixture to be shaped under pressure.

Furthermore, the sawdust particles must have a diameter comprised between 0.5 mm and 4 mm and, preferably, between 1 and 3 mm.

In fact, particles of smaller diameters have only the drawback of mechanically weakening the baked pavings without giving the characteristics of capillarity and permeability necessary for the invention.

Concerning the particles of larger diameters, they do not contribute optimally to obtaining the effect of capillarity.

In addition, it is desirble for the particles of sawdust to be of length shorter than 4 mm. Too long particles may be a source of drawbacks similar to those resulting from the presence of too large particles. Furthermore, during shaping, they may provoke manufacturing defects.

To obtain a suitable sawdust, it is for example most advantageous to pass a sawdust resulting from a large-blade sawing, in a drum sieve enabling the undesirable too large or too fine particles to be eliminated. The rotary drum sieve has the advantage, over the vibrating sieve, of not allowing the long particles to pass.

The clay and sawdust chosen are mixed in the proportions indicated hereinabove.

Volume of clay is understood to mean the volume that the clay occupies in the deposit, before its extraction and expansion, the latter tending to considerably increase said volume. It is of little importance that, in the deposit, the clay comprises interstitial water, since this water affects the volume of the clay only very slightly.

Volume of sawdust is understood to mean a volume of dry, non-compressed sawdust, poured for example in a measuring recipient and levelled with the edge of said recipient.

The clay is passed into clod-crushers, stone-removers, grinders and rollers. It is preferable to effect rolling before the clay is mixed with the sawdust in order to avoid said sawdust being crushed.

The mixture of clay and sawdust must be as homogeneous as possible. It may be obtained by a succession of mixings with the aid of mixers with close blades, much more numerous than for the manufacture of ordinary terra cotta.

The mixture must comprise from 8 to 30% by weight of water with respect to the weight of the mixture with a view to being able to carry out shaping under pressure. This water content may vary, mainly according to the type of shaping under pressure employed, and must be chosen to be as low as possible.

Before adding water, the interstitial water possibly naturally present in the clay must of course be taken into account, and only the necessary complement must be added. The clay, sawdust and water may be mixed with the aid of a wettermixer. A mixture of clay, sawdust and water is then obtained in conditions and quantities as provided by the present invention.

This mixture subsequently undergoes a shaping under pressure which may be effected, for example, by extrusion or by moulding and pressing.

If extrusion is chosen, the mixture must preferably comprise from 20 to 30% by weight of water. An extruding machine is then used which exerts a pressure higher than 15 kg/cm$^2$ and, if possible, higher than 20 kg/cm$^2$, and comprising a deaeration system.

If moulding and pressing is chosen, a mixture may be used which comprises less water, for example from 8 to 20% by weight of water.

The shaped, unbaked pavings, suitably disposed, are then dried. Drying is preferably effected by blowing damp, then dry air.

This drying is preferably slow, since the unbaked pavings prepared in accordance with the invention generally comprise more water than the conventional bricks or tiles. Such a drying may preferably last about 45 to 72 hours at a temperature of between 50° and 80° C.

The suitably dried pavings are then baked at a temperature between the temperature above which the terra cotta is not frost-susceptible and the melting (or vitrification) temperature of the clay.

In fact, the clays reputed not to be frost-susceptible which may be used within the scope of the present invention, have a temperature below which the terra cotta is more or less frost-susceptible, but, in any case, unusable. This temperature, or frost-susceptibility treshold, is, for the majority of the clays, between 850° and 950° C. and generally, around 940° C. Those clays are chosen for which the melting or vitrification temperature is clearly above this threshold.

Within the scope of the present invention, it is imperative to bake at a temperature lower than the melting (or vitrification) temperature, otherwise a fusion would appear, at least on the surface and, after a longer time, in the centre, which fusion would block the vessels which give the paving its qualities of capillarity and water-permeability.

In order to be able, in practice, to regulate the temperature of the furnace, it is desirable to use clays of which the temperature difference between the frost-susceptibility threshold and the melting temperature is at least 40° C.

In addition, with a view to improving the mechanical properties of the paving, it is desirable to effect baking at a temperature fairly close to the melting temperature, whilst remaining imperatively at a temperature lower than said latter.

With a view to improving combustion of the sawdust, it is preferable to overoxygenate the furnace with respect to a conventional terra cotta manufacture.

The mechanical properties of the pavings are improved by subjecting them to a water-tempering when leaving the furnace, the pavings being, just before tempering, at a temperature higher than about 300° C.

With a view to ensuring the opening of all the pores to the outside, it is necessary to pumice the faces of each paving manufactured. The pumicing may be adapted so that it constitutes a machining, or rectification, so that all the faces are at right angles, this being highly desirable in view of the making of a ground coating.

The pavings according to the invention may comprise internal longitudinal channels, of section of the order of a few cm$^2$, formed in their thickness. In a ground coating formed by these pavings, the channels placed end to end facilitate, beyond saturation point, the draining of the water flowing in the upper part of the coating.

The pavings with internal draining channels are of course manufactured by extrusion.

It is desirable that their thickness be comprised between 4 and 6 cm. The lower value complies with the requirement of mechanical resistance, but the higher value is not critical.

It is, however, more particularly an object of the present invention to provide thin pavings which are solid, i.e. without internal draining channels, which may be used, in particular, for forming outside sport ground coatings, such as, for example, for tennis courts.

For obvious reasons of mechanical resistance, the thickness of the pavings must preferably be more than 1 cm. However, it is not necessary that this thickness exceeds 3 cm, or even 2 cm, as the manufacture is the more complicated, during drying and baking, as the product is thick.

Thin pavings cannot be manufactured as such by extrusion, under satisfactory conditons, as the extrusion may provoke a more or less marked twist of the product during drying or baking. Moulding and pressing must therefore be chosen to manufacture the thin pavings directly.

However, it is possible to manufacture thin pavings by extrusion, the extruded product being constituted by two, or more, superposed thin pavings, separated from each other by longitudinal cross-pieces constituted by the product itself.

The gaps between cross-pieces are dimensioned to be able to serve for ventilation during drying and baking. Their transverse section has, to this end, in the thickness of the extruded product, a dimension larger than 10 mm, for example between 12 and 15 mm.

The surface of the transverse section of the cross-pieces may be limited to the minimum necessary for the good holding of the extruded product during drying and baking.

These cross-pieces are broken, after baking, for example by sawing or milling, to obtain thin pavings. This breaking of the cross-pieces is advantageously effected by means of a tool of sufficient thickness to simultaneously ensure the separation of the pavings, and the rectification and pumicing of their faces located opposite one another.

It is desirable to place the thin pavings on a permeable sublayer which enables the water passing through the pavings to be evacuated. To produce, for example, a tennis court coating, the thin pavings may be joined or sealed, side by side, to a layer of permeable material such as, for example, no-fines concrete.

It is obvious that the product for joining the pavings and the sub-layer must not block the pores of one or the other. After having been laid, the coating is pumiced particularly to ensure flatness of its upper face.

Other features of the process and of the pavings according to the invention will appear on reading the following nonlimiting example given as illustration.

EXAMPLE 1

To make the clay-sawdust mixture, Puisaye clay from Moutier Saint-Sauveur in France is used. This clay has a frost-susceptibility threshold of about 940° C. and a vitrification temperature of about 990° C.

After having measured 100 parts by volume of clay in the compressed state, i.e. the volume of the clay in its deposit in the naturel state, said clay is passed into clod-crushers, stone-removers, grinders and rollers. The last calendering is regulated to 6/10th mm. To this clay thus treated are added 130 parts by volume of dry, non-compressed soft wood sawdust, of which the average diameter of the particles is between 1 and 3 mm after passage in a double sieve.

The mixture thus made passes into a wetter-mixer of conventional type and water is added so that the water content of the mixture is about 24% by weight.

The mixture then passes into a series of mixers with close blades until an excellent homogeneity is obtained.

The intimate mixture which is perfectly regular and homogeneous, and without the least lump, passes into an extruding machine provided with a deaeration system. The pressure in the extruding machine is of the order of 15 kg/cm$^2$.

The straight parallelepipedic pavings formed are then disposed in driers, whilst being maintained flat to avoid deformations. Drying is effected by blowing damp, then dry air for 72 hours at 80° C.

The dried pavings are baked in a furnace at a temperature close to 970° C. for 24 hours with a slow rise in temperature.

The pavings obtained are finally pumiced and rectified on their six faces.

Such a paving has 48.4% of its internal volume permeable to water, i.e. 48.4% empty space. By immersing the paving in water, said paving may retain water in 25% of its volume, i.e. about 52% of its empty space is filled with water. Inside the paving, vessels are observed which are constituted by contiguous pores of different diameters, interconnected and passing through the paving in all directions.

Mesurements of porosity have made it possible to determine that 55% of the empty space is constituted by pores having a diameter larger than 15$\mu$, 10% of the empty space is constituted by pores having a diameter larger than 26$\mu$, and 90% of the empty space is constituted by pores having a diameter larger than 0.3$\mu$.

COMPARATIVE EXAMPLE 1

The method of Example 1 is carried out, with the baking being effected at 920° C. Pavings are obtained which are brown in colour, frost-susceptible and therefore unusable.

COMPARATIVE EXAMPLE 2

The method of Example 1 is carried out, with the baking being effected at 990° C. Dark red pavings are obtained having a beginning of vitrification on the surface, an absence of porosity on the surface and a considerable reduction of porosity in the centre.

COMPARATIVE EXAMPLE 3

The method of Example 1 is carried out, but using 196 parts by volume of sawdust for 100 parts by volume of clay. A very permeable paving is obtained, but it is unusable as it is too friable and is deformed on drying and baking.

COMPARATIVE EXAMPLE 4

The method of Example 1 is carried out, but using 60 parts by volume of sawdust for 100 parts by volume of clay. A very hard paving is obtained which, however, is insufficiently permeable, has a surface which is too smooth after pumicing and is subject to sligh degradation in the case of frost. The paving is therefore unusable.

What is claimed is:

1. A method of manufacturing terra cotta pavings which may be used as ground coating, said pavings not being frost-susceptible, being porous and water-permeable, the method comprising the steps of:

intimately mixing 100 parts by volume of clay with 80 to 160 parts by volume of dry, non-compressed sawdust, the sawdust being essentially formed of particles whose average diameter is comprised between 0.5 mm and 4 mm;

adding water to the mixture such that the total water content is between 8 and 30% by weight with respect to the weight of the mixture;

forming the pavings under pressure;

drying the pavings;

baking the pavings at a temperature between the temperature, above which the terra cotta obtained from the clay used is not frost-susceptible, and the melting temperature of this clay, and, subjecting the faces of the pavings to pumicing.

2. The method of claim 1, wherein 100 parts by volume of clay are intimately mixed with 120 to 135 parts by volume of sawdust.

3. The method of claim 1, wherein the clay used presents a difference of at least 40° C. between the temperature, above which the terra cotta is not frost-susceptible, and the melting temperature.

4. The method of claim 1, wherein the diameter of the sawdust particles is comprised between 1 and 3 mm.

5. The method of claim 1, wherein sawdust is used whose particles length is shorter than 4 mm.

6. The method of claim 1, wherein the forming under pressure is effected by moulding and pressing.

7. The method of claim 1, wherein the forming under pressure is effected by extrusion.

8. The method of claim 7, wherein extrusion is carried out under a pressure higher than 15 kg/cm$^2$.

9. The method of claim 7, wherein a plurality of superposed pavings are formed, maintained in spaced apart relationship by longitudinal cross-pieces of sufficient section to ensure the holding of the extruded product during drying and baking, and the individual pavings are separated, after baking, by breaking said cross-pieces.

10. The method of claim 1, wherein the baking is carried out at a temperature close to but lower than the melting temperature.

11. The method of claim 1, wherein baking is carried out in an overoxygenated furnace.

12. The method of claim 1, further comprising the steps of subjecting the pavings to water-tempering on leaving the furnace, the temperature of the pavings before tempering being at least 300° C.

13. A paving manufactured in accordance with the method of claim 1.

14. The paving of claim 13, wherein its thickness is between 1 and 3 cm.

15. The method as defined in claim 1 wherein drying is effected at a temperature of between 50° to 80° C. for a time period between 45 and 72 hours.

16. The method as defined in claim 1 wherein said temperature above which terra cotta is obtained from clay is between 850° to 950° C.

17. The method as defined in claim 1 wherein said sawdust is obtained from a low density wood.

* * * * *